(12) United States Patent
Thoma

(10) Patent No.: US 8,205,520 B2
(45) Date of Patent: Jun. 26, 2012

(54) GEAR ARRANGEMENT

(75) Inventor: Helmut Thoma, Löffingen (DE)

(73) Assignee: IMS Gear GmbH, Donaueschingen (DE)

( * ) Notice: Subject to any disclaimer, the term of this patent is extended or adjusted under 35 U.S.C. 154(b) by 1906 days.

(21) Appl. No.: 10/647,912

(22) Filed: Aug. 25, 2003

(65) Prior Publication Data

US 2004/0069086 A1   Apr. 15, 2004

(30) Foreign Application Priority Data

Aug. 23, 2002   (DE) .................................. 102 39 577

(51) Int. Cl.
*F16H 55/18* (2006.01)
(52) U.S. Cl. ............................... 74/440; 74/409; 74/443
(58) Field of Classification Search .................... 74/443, 74/445, 441, 440, 409
See application file for complete search history.

(56) References Cited

U.S. PATENT DOCUMENTS

| | | | | |
|---|---|---|---|---|
| 108,539 A | * | 10/1870 | Ward | 74/440 |
| 1,803,293 A | * | 4/1931 | Bethune | 74/443 |
| 1,803,294 A | * | 4/1931 | Bethune | 74/443 |
| 1,803,296 A | * | 4/1931 | Bethune | 74/443 |
| 3,359,819 A | * | 12/1967 | Veillette et al. | 74/409 |
| 3,385,126 A | * | 5/1968 | Finch | 74/440 |
| 3,602,058 A | * | 8/1971 | Beddoe | 74/434 |
| 3,719,103 A | * | 3/1973 | Streander | 74/445 |
| 3,988,942 A | * | 11/1976 | Greiner | 74/445 |
| 4,033,198 A | | 7/1977 | Seragnoli | 74/443 |
| 4,189,951 A | * | 2/1980 | Sauter | 74/440 |
| 5,979,259 A | * | 11/1999 | Shook et al. | 74/409 |
| 6,419,061 B1 | * | 7/2002 | Ring et al. | 192/45 |
| 2002/0121152 A1 | * | 9/2002 | White et al. | 74/445 |

FOREIGN PATENT DOCUMENTS

| | | | |
|---|---|---|---|
| DE | 846 192 | | 8/1952 |
| DE | 3 026 685 | | 2/1982 |
| DE | 33 28 145 | | 2/1985 |
| JP | 59117951 | * | 7/1984 |
| JP | 59117951 A | * | 7/1984 |
| JP | 61-218867 | * | 9/1986 |

* cited by examiner

*Primary Examiner* — Troy Chambers
*Assistant Examiner* — Terence Boes
(74) *Attorney, Agent, or Firm* — O'Shea Getz P.C.

(57) ABSTRACT

To render a gear arrangement for a transmission as quiet as possible but nevertheless able to handle heavy loads, a first gear made of a first material and a second gear made of a second material sit loosely next to one another on a common shaft. The elasticity of the first gear, preferably made of plastic, is chosen to be greater than that of the second gear, preferably made of metal, while the strength of the second gear is chosen to be greater than that of the first gear. Because the second gear preferably exhibits a slightly smaller toothing than the first gear, only the first gear comes into engagement with another gear in normal operation. As the load increases, the first gear made of plastic yields in the elastic range so that now the second gear made of metal also comes into engagement in order to accept the forces occurring and thereby protect the first gear against overloading and fracture. The gear arrangement is generally suitable for transmissions, for example for planetary transmissions.

20 Claims, 4 Drawing Sheets

GEAR ARRANGEMENT

BACKGROUND OF THE INVENTION

The present invention relates to the field of gear arrangements, and in particular to gear arrangements constructed of dissimilar materials.

Gear arrangements are known for example from German patent DE1961982. The gear combination disclosed in this German patent provides gears that rotate on a common shaft, and the teeth of one gear are arranged side by side relative to the teeth of another gear. The larger gear is made of plastic and the smaller gear is made of metal. Both gears are arranged stationarily and fixedly relative to one another on the shaft, for example with a key and keyway. Similar gear arrangements are disclosed in German patents DE2602152A1, DE3026685A1, DE846192C and U.S. Pat. No. 3,719,103. In the above-cited gear combinations the gears made of different construction materials are, in contrast, rigidly fixed on the shaft or fixed, for example cemented to one another, with their surfaces facing toward one another. In this way slipping of the gears relative to one another in the direction of rotation is impossible.

In transmissions, gears engaging with one another transmit force and torque. However, the engagement of the teeth of the gears with one another causes disturbing and sometimes rather loud and unpleasant noise. For noise damping, the gears can be made of suitable materials such as plastic. Further noise reduction can be achieved by helical toothing of the gears.

While gears made of plastic are distinguished by the advantage of less noise, they have the disadvantage of lower strength. Similarly, gears made of metal display high strength but produce relatively loud noise. For transmission gears, one therefore seeks to find a material that produces low noise but has the requisite strength requirements. Therefore, there is often a design compromise between higher strength versus less noise.

Therefore, there is a need for improved gear arrangements.

SUMMARY OF THE INVENTION

Gear arrangements having first and second gears made of two different materials sit loosely on a common shaft or common axis so that slipping of the gears sitting next to one another in the direction of rotation of the two gears is possible independently of one another.

By the loose arrangement of the gears on the shaft an asymmetric alignment of the toothings relative to one another comes about in the load case. The elasticity of the softer gear, for example the gear made of plastic, can be utilized for the deformation over a wider range, and also more safely than in the prior art because the softer material is not hindered in its deformation by a mechanical connection to the more rigid gear. This circumstance increases the damping properties and reduces the risk of damage. This risk of damage is, however, great in the case of the known gear combinations in which the gears are rigidly connected to one another, because stress cracks or notch effects can occur at the places of connection of the gears rigidly connected to one another. If the gears in the case of the prior art are fastened to one another with feather-key keyways, these damages can occur at these feather-key keyways An advantage of the gear arrangements of the invention is that expensive and laborious techniques for connecting the gears to one another can be avoided. In addition, the gear combinations can also be used where connection of the gears has not been possible for reasons of space. Furthermore, precise radial alignment of the toothings relative to one another is not required.

The gears having greater elasticity are preferably made of plastic, while metal is preferably chosen as the material for the gears having greater strength.

One embodiment of the second gear (e.g., a metal gear) exhibits a slightly smaller toothing than the first gear (e.g., a plastic gear). Therefore, under normal loading only the first gear made of plastic stands in engagement with another gear. As the load becomes greater, for example in the event of an overload, the first gear made of plastic yields in the elastic range so that the second gear made of metal also comes into engagement and can accept the high forces that now occur. In this way the first gear made of plastic is safely protected against overloading and fracture.

A further embodiment of the invention provides for a combination of three gears lying next to one another on a shaft, the two outer gears exhibiting greater elasticity than the middle gear or vice versa. The outer gears are preferably made of plastic or metal, while the middle gear is made of metal or plastic.

The gears are preferably helically toothed. The teeth of the gears lying next to one another can for example line up. The gears arranged next to one another can, however, also be slightly offset relative to one another.

In normal operation, the noise level is low because only the gears made of plastic are in engagement with one another. In the case of high load, the noise level increases somewhat because now the gear made of metal is engaged with another gear. Therefore, the noise level is a measure of the loading of the gears and can therefore be employed for measurement purposes. For example, a recalibrated acoustic level meter can display the loading of the gears.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
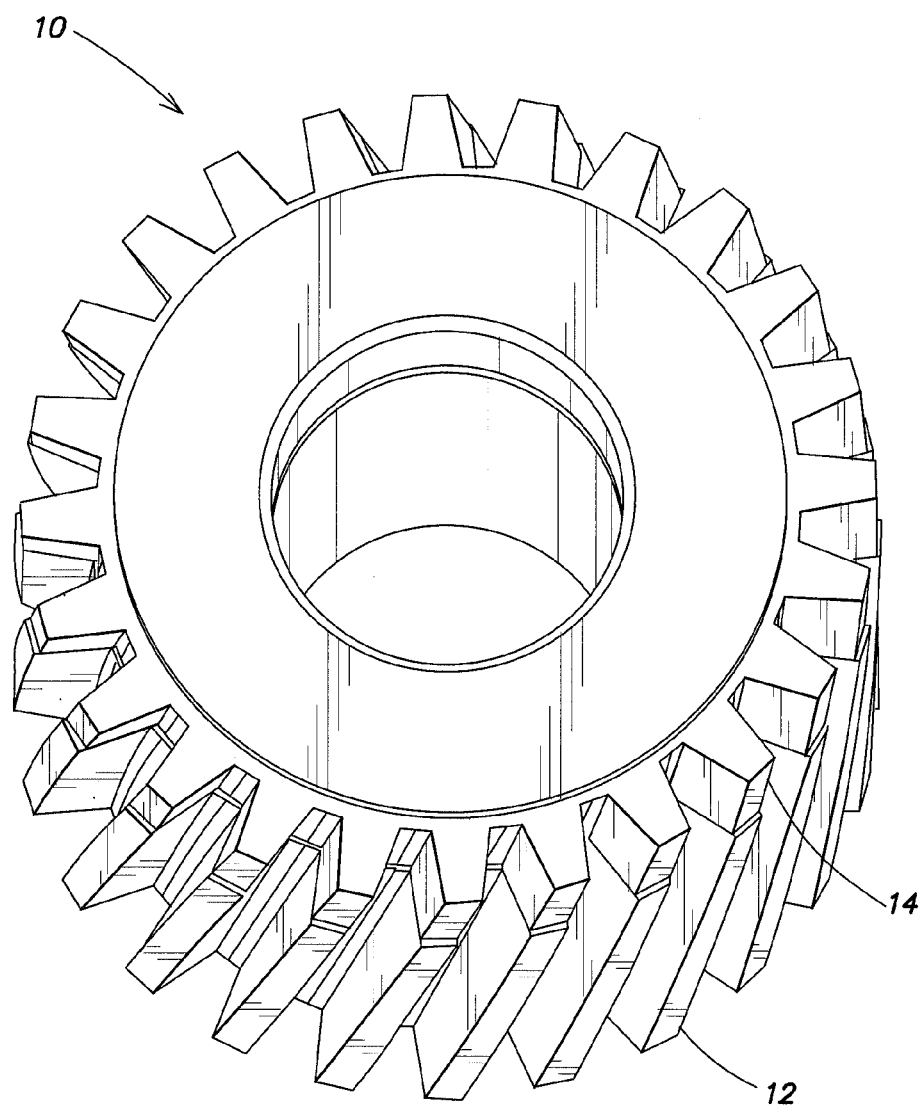
FIG. 1 is a perspective view of a gear arrangement.

FIG. 1 illustrates a gear arrangement 10 that includes a first gear 12 and a second gear 14. The first gear 12 is arranged immediately adjacent to the second gear 14. The first gear 12 is preferably made of plastic, while the second gear 14 is made of metal. The second gear 14 has a slightly smaller toothing than the first gear 12. For ease of illustration, the shaft on which the gears 12 and 14 sit is not drawn.

Figure 2:
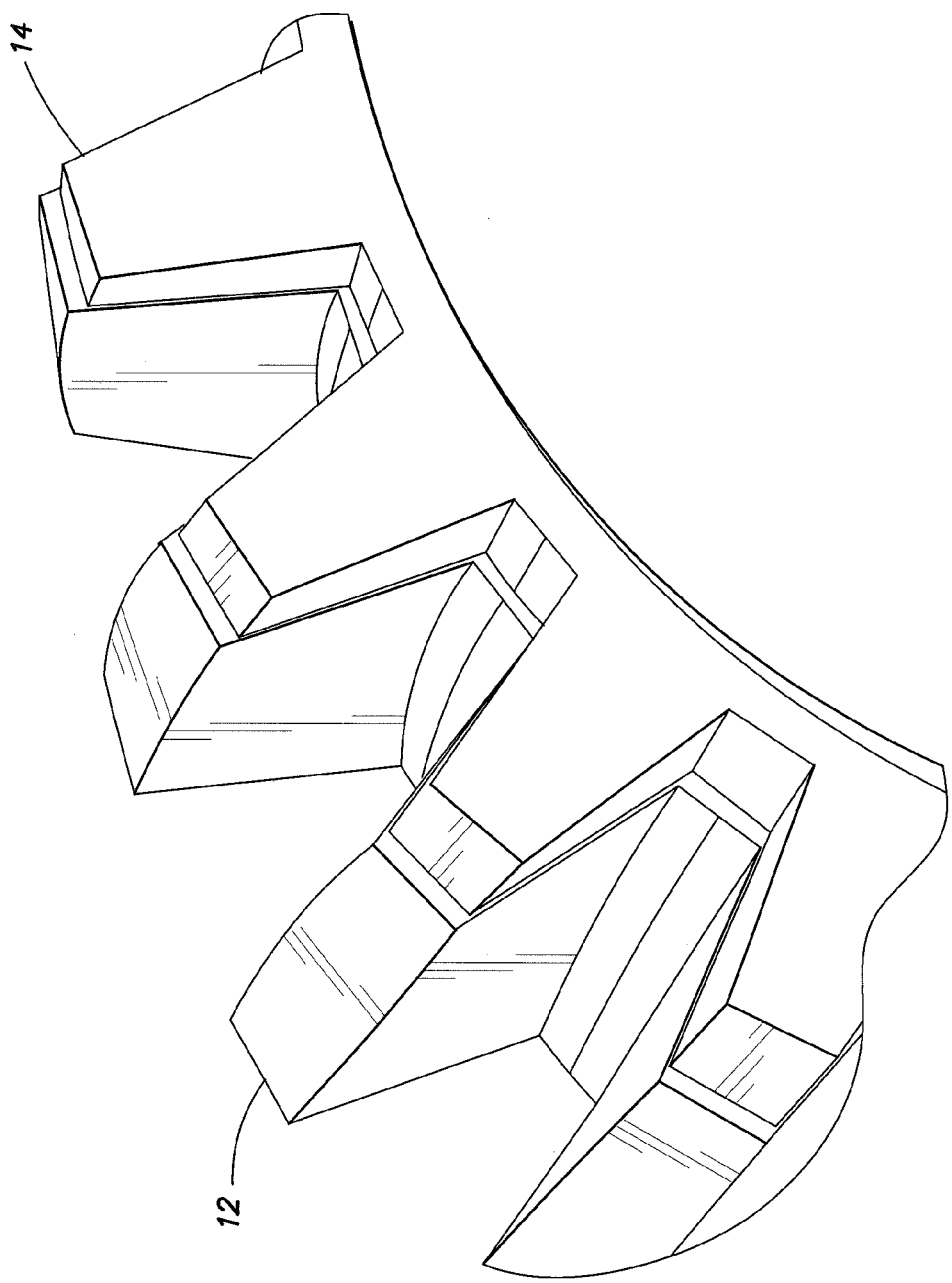
FIG. 2 is an enlarged detail of a portion of the gear arrangement illustrated in FIG. 1.

FIG. 2 shows an enlarged detail from FIG. 1 in which the different toothing of the two gears 12 and 14 is emphasized. The second gear 14 does not come into engagement until the first gear 12 made of plastic yields in the elastic range. The thickness of the first gear 12 is preferably chosen to be greater than that of the second gear 14.

Figure 3:
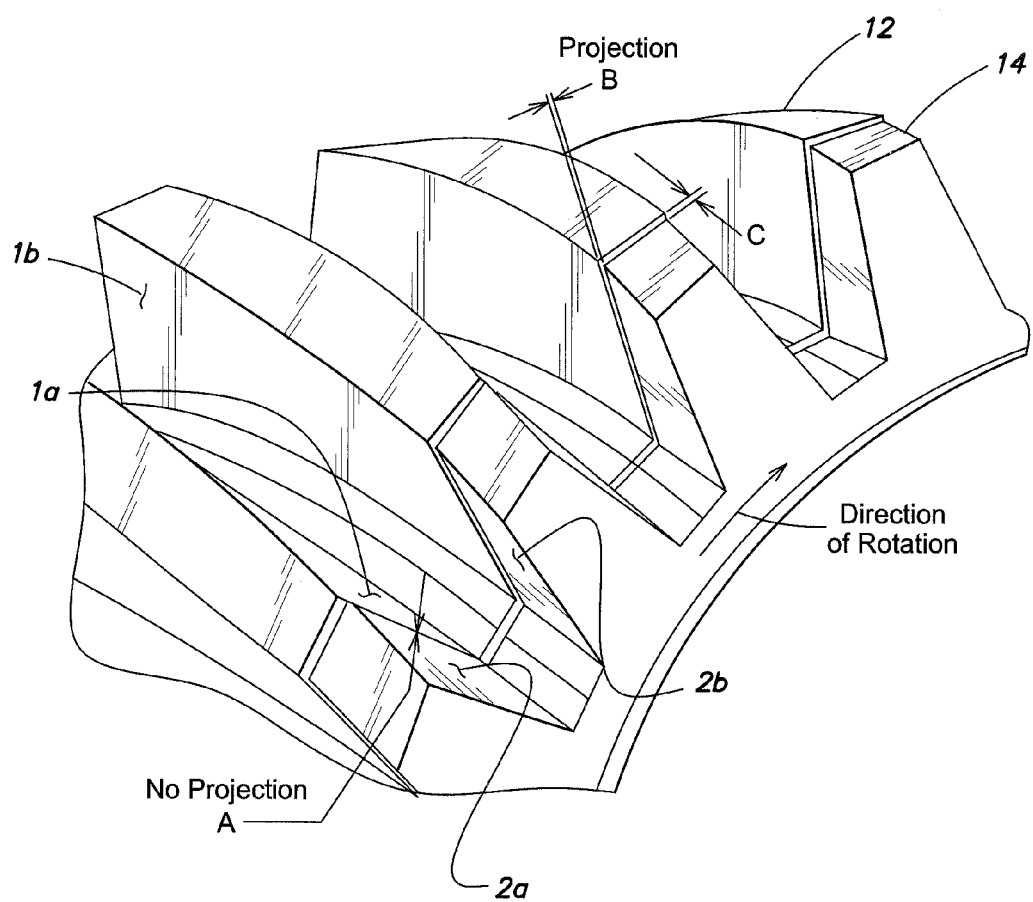
FIG. 3 illustrates an asymmetric alignment of the gears of the gear arrangement illustrated in FIG. 1.

Referring to FIG. 3, the gears 12, 14 can turn independently of one another because of their loose arrangement on the shaft. In case of load, this leads to a situation in which the front sides of both the gears 12, 14 align relative to one another and no projection A arises. Front faces 1a and 2a of the gears 12, 14 respectively line up with one another. In contrast, on the back of both the gears 12, 14 (i.e., on the side of the gears 12, 14 facing away from the direction of rotation) a projection B is formed at the transition from back 1b of the first gear 12 to back 2b of the second gear 14. As shown in FIG. 3, the tooth depth of the second gear 14 is slightly smaller, for example by an amount C, than the tooth depth of the first gear 12.

Figure 4:
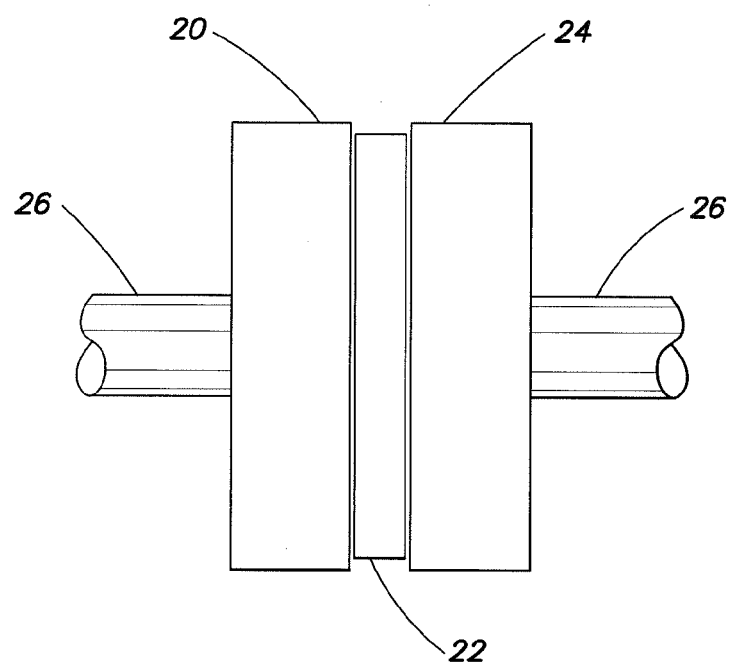
FIG. 4 illustrates a side view of a gear arrangement that includes these gears.

Another embodiment is shown in side view in FIG. 4. A first gear 20, a second gear 22, and a third gear 24 sit loosely or rigidly on a common shaft 26. The elasticity of the first gear 20 and the third gear 24 is chosen to be greater or smaller than that of the second gear 22, whose strength is chosen to be greater or smaller than the strength of both the outer gears 20 and 24. The first gear 20 and the third gear 24 are preferably made of plastic or metal, while metal or plastic is provided as material for the middle gear 22. As in the previous embodiments, the toothing of the middle gear 22 made of metal having the same modulus is chosen to be slightly smaller than in the case of the two outer gears 20 and 24 made of plastic. The middle gear 22 can, however, also be made of plastic while both outer gears 20 and 24 are made of metal. In this case the toothing of both the outer gears 20 and 24 having the same modulus is chosen to be slightly smaller than in the case of the middle gear 22. The mode of functioning of the third exemplary embodiment illustrated in FIG. 3 corresponds to that of the previous embodiments. The gears 20, 22, and 24 are preferably helically toothed.

The gear arrangement according to the invention is generally suitable for transmissions, for example for planetary transmissions. Advantageously, transmissions having gear arrangements according to the invention are distinguished by a low noise level and high overload protection.

Although the present invention has been shown and described with respect to several preferred embodiments thereof, various changes, omissions and additions to the form and detail thereof, may be made therein, without departing from the spirit and scope of the invention.

What is claimed is:

1. A gear arrangement operably arranged with a rotatable shaft, comprising a first gear made of a first material and a second gear made of a second material different than the first material, wherein the first and second gears are disposed co-axially adjacent one another on the shaft, wherein the elasticity of the first gear is greater than that of the second gear, wherein the strength of the second gear is greater than that of the first gear, and wherein the first gear and the second gear are arranged on the shaft axially detached from each other such that the first and second gears rotate in the same direction relative to the shaft and independently of each other.

2. The gear arrangement of claim 1, comprising a third gear made of the same material as the first gear and that sits on the common shaft, on the side of the first gear that is still free.

3. The gear arrangement of claim 2, wherein the first and third gears are metallic while the second gear is made of plastic, and the first and third gears having greater strength and having the same modulus exhibit a smaller toothing than the second gear having greater elasticity.

4. The gear arrangement of claim 3, wherein teeth of the first, second and third gears are co-axially arranged next to one another.

5. The gear arrangement of claim 3, wherein the first, second and third gears arranged next to one another are offset relative to one another.

6. The gear arrangement of claim 2, wherein the first, second and third gears each comprise a plurality of helical teeth with respect to the common shaft.

7. The gear arrangement of claim 6, wherein the first gear and the second gear sit on the common shaft in such a way that the first and second gears are able to turn relative to one another about their respective axes.

8. The gear arrangement of claim 7, wherein the first gear and the second gear are not directly connected to one another along their axial surfaces.

9. The gear arrangement of claim 8, wherein the first gear and the second gear are asymmetrically alignable relative to one another with respect to their toothing.

10. The gear arrangement of claim 1, wherein the first and third gears are made of plastic while the second gear having less elasticity but greater strength is made of metal.

11. A transmission gear assembly operably arranged with a rotatable shaft, that engages a cooperating gear, the transmission gear assembly comprising:
    a first gear having a plurality of first gear teeth located along the radial periphery of the first gear; and
    a second gear having a plurality of second gear teeth located along the radial periphery of the second gear;
    wherein the first and second gears are operably positioned co-axially on the shaft and axially detached from each other to allow independent rotation of the first and second gears in the same direction with respect to each other, wherein the first gear is constructed from a first material and the second gear is constructed from a second material different than the first material, and wherein the first gear has a greater elasticity than that of the second gear, wherein the first gear is engaged with the cooperating gear and the second gear is disengaged from the cooperating gear when an amount of load applied to the first gear does not exceed an amount that overloads the first gear.

12. The transmission gear assembly of claim 11, wherein the first gear teeth and the second gear teeth are helically arranged adjacent to one another.

13. The transmission gear assembly of claim 12, comprising:
    a third gear positioned co-axially with respect to said first and second gears to allow independent rotation of said first, second and third gears in the same direction with respect to each other.

14. The transmission gear assembly of claim 13, wherein said first and third gears are primarily plastic and said second gear is primarily metallic.

15. The transmission gear assembly of claim 11, wherein the first gear teeth and the second gear teeth are helically arranged offset to one another.

16. The transmission gear assembly of claim 11, wherein the first material comprises plastic and the second material comprises metal.

17. The transmission gear assembly of claim 11, comprising:
    a third gear positioned on the axis to allow independent rotation of said first, second and third gears in the same direction with respect to each other around the axis, said third gear being constructed of a material having the same elasticity of said second gear.

18. A transmission gear assembly operably arranged with a rotatable shaft that engages a cooperating gear, the transmission gear assembly comprising:
    a first gear having a plurality of first gear teeth located along the radial periphery of the first gear; and a second gear having a plurality of second gear teeth located along the radial periphery of the second gear;

wherein the first and second gears are operably positioned co-axially on the shaft and axially detached from each other to allow independent rotation of the first and second gears in the same direction with respect to each other, wherein the first gear is constructed from a first material and the second gear is constructed from a second material different than the first material, wherein the first gear has a greater elasticity than that of the second gear, wherein the first gear engages the cooperating gear and the second gear is not engaged with the cooperating gear when an amount of load applied to the first gear does not overload the first gear, and wherein both the first and second gears engage the cooperating gear when an amount of load applied to the first gear overloads the first gear.

19. The transmission gear assembly of claim 18, wherein the first gear is plastic and the second gear is metallic.

20. The transmission gear assembly of claim 18, comprising:

a third gear positioned on the axis to allow independent rotation of said first, second and third gears in the same direction with respect to each other around the axis, said third gear being constructed of a material having the same elasticity of said second gear, wherein absence of high torque said second gear is not engaged with the cooperating gear and during high torque said first and second gears yield to disengage from the cooperating gear and said second gear engages the cooperating gear.

* * * * *